Patented Jan. 20, 1942

UNITED STATES PATENT OFFICE 2,270,518

NUTRIENT SOLUTION

Carleton Ellis, Montclair, N. J.; Bertram Ellis, Carleton Ellis, Jr., and The Bank of Montclair, executors of said Carleton Ellis, deceased, assignors to Ellis Laboratories, Incorporated, a corporation of New Jersey No Drawing. Application June 2, 1938,
Serial No. 211,413

3 Claims. (Cl. 71—1)

This invention relates to the hydroculture of vegetables and flowers and applies particularly to control of the rate of vegetative growth. It involves especially regulation of ripening or blooming of vegetables or flowers, respectively, and also regulation of the mineral salt content of plants. It also involves the preparation of nutrient or fertilizing compositions which may be employed to secure the aforementioned results.

Hydroculture methods consist essentially in the growing or cultivation of plants while their roots are kept either immersed in or always in contact with an aqueous nutrient solution. Since procedures of this type do not require the use of soil they have been designated also as soilless growth, water culture, solution culture, aquaculture, or hydroponics. Although many variations of hydroculture operations have been devised they may be divided into two main types. In the first of these the plant is grown in a mass of inert material, e. g., straw, excelsior, asbestos wool, which is held firmly in position a short distance, say an inch or so, above the level of an aqueous solution containing dissolved plant nutrients. The bottom of the plant bed should be sufficiently porous or possess sufficiently wide openings that the plant roots may extend through it and dip or remain immersed in the aqueous solution.

In the other type of operation the plant roots are kept in a bed of inert material such as sand or cinders which is moistened with the aqueous nutrient. This latter effect may be accomplished by allowing the nutrient solution to slowly drip onto the bed and slowly seep through it. Another procedure comprises flooding occasionally the bed of inert material with the nutrient solution, pumped from a reservoir or other suitable container, and then allowing the solution to drain slowly back into the reservoir. These alternate flooding and draining operations can be repeated at frequent intervals, thus preventing the bed of sand or other inert material from becoming completely dry due to loss of residual aqueous solution by evaporation or its being absorbed by the plant roots.

Regardless of the particular method, or variation thereof, which is employed the plant roots are maintained always in contact with an adequate supply of water and nutrients. The latter being dissolved in the aqueous liquid are present continually in a readily available and assimilable form. Hydroculture, therefore, for all practical purposes represents cultivation under optimum conditions, and as a result plants should attain a rapid and healthy growth accompanied by a corresponding greater yield in fruit or flowers.

The principal nutrient elements required by plants are potassium, nitrogen, phosphorus, magnesium, sulphur and calcium. Various salts, which are water-soluble and which may contain one or more of these elements, can be employed as the nutritive ingredients. A solution which will serve in many instances for the hydroculture of plants is made by dissolving monopotassium phosphate ($KH_2PO_4$), 5.9 grams, calcium nitrate ($Ca(NO_3)_2 \cdot 4H_2O$), 20.1 grams, magnesium sulphate ($MgSO_4 \cdot 7H_2O$), 10.7 grams, and ammonium sulphate (($NH_4)_2SO_4$), 1.8 grams, in 5 gallons of water. In addition to the above named elements certain others, e. g., iron, zinc, manganese, boron and copper, are required in small proportions. Of these, often designated as trace elements, probably iron is most important, and the iron requirement may be provided by adding about 0.160 gram of ferrous sulphate ($FeSO_4 \cdot 7H_2O$) to the previously mentioned nutrient solution. As necessary, the other trace elements may be added in very small proportions in the form of salts or other compounds soluble in water, as for example, zinc sulphate, copper sulphate, boric acid.

For best results the osmotic concentrations, i. e., the possible osmotic pressure which may be developed, of nutrient solutions generally should be relatively low, say 0.5 to 0.7 atmosphere. However, in some cases somewhat higher or lower values may be applicable. In extreme instances, though, solutions of osmotic concentrations of several atmospheres may be employed.

By varying the concentration as well as the types of salts in the nutrient solution (or solutions) employed it is possible to regulate, control or modify such factors as the rate of growth of the plant, the rapidity with which flowering occurs and the content of mineral and/or other constituents in the fruit. This regulatory action may be put into effect just after germination of the seed or when the plant (or plants) is young and just beginning its development and control continued throughout the life of the specimen (or specimens) at hand. On the other hand, the desired results may be secured by effecting regulatory measures, for example, coincidently with the budding or fruiting period. Thus, in some plants the magnesium and phosphorus contents increase during the entire vegetation period and the proportions of calcium, potassium and nitrogen increase during the earlier periods of growth. In such instances, the concentration of magnesium and phosphorus (as water-soluble salts thereof) in the nutrient medium will be kept constant so that a sufficient supply will always be available. The concentrations of calcium, potassium and nitrogen, on the other hand, should be relatively high in the nutrient medium during the early period of plant growth, thus furnishing an abundant quantity of these elements. Later, the concentrations of these latter three elements may be decreased somewhat as they are not then required in such large proportions.

The various nutrient elements, both essential and trace elements, will be absorbed by different types of plants in widely varying amounts but by employing hydroculture methods and regulating the proportions and quantities of nutrient salts, plants or fruits therefrom may be cultivated which contain an increased or enhanced mineral content over that of soil-grown products.

As an illustration of the regulatory effect induced by changing the proportion of nutrients in solution the following is cited. A dormant rose bush was grown in sand which was kept moistened by allowing a solution containing nutrient salts (in the proportions previously given) to drip slowly onto it continuously. In addition to iron, potassium, magnesium and the other elements there was added also copper sulphate so that the proportion of copper was equivalent to 1 part in 10,000,000 of solution. The rose bush quickly responded, and grew rapidly. At the end of eight weeks the plant had several buds and opened roses. It was noted that on cutting the buds and placing the stems thereof in water these also opened quickly. The potassium and phosphorus content of the nutrient liquid was doubled by increasing the quantity of monopotassium phosphate from 5.9 grams to 11.8 grams per 5 gallons of water. After feeding the rose for ten days with the solution containing the larger phosphorus and potassium contents and then cutting off the buds and placing them in water as before, it was noted they opened very much slower. This phenomenon of the bud or flower opening slowly is designated as petal retention.

The above example illustrates how growth of plants may be controlled by means of the essential nutrient elements. As previously mentioned, the mineral content may be varied also by the proper choice of nutrient salts and this is of particular importance in the case of fruits intended for human consumption. Either the mineral content as a whole may be increased or a particular ingredient thereof.

For example, tomatoes are a variety of vegetable which readily respond to hydroculture operations. These can be grown by placing the young plants in a wire basket which is filled with straw and suspended about one inch above the nutrient solution, the latter being kept in a suitable tank or container. A nutrient solution containing 5.8 grams of superphosphate (monocalcium phosphate plus calcium sulphate), 6.4 grams of sodium nitrate, 10.3 grams of Epsom salts (hydrated magnesium sulphate) and 3.9 grams of potassium chloride in 5 gallons of water is applicable for the propagation of this vegetable. By adding 0.5 gram of potassium iodide to this solution (in addition to the salts just mentioned) tomatoes having an increased iodine content may be secured. Such vegetables having a larger proportion of iodine, or iodides, would be of particular value in those localities in which goiter is more or less prevalent due to a deficiency of available iodine in the articles of dirt.

As an alternative method, a portion of the potassium chloride (in the formula mentioned above) may be replaced by an equivalent quantity of potassium iodide. In this manner the total concentration of salts in solution can be maintained substantially constant. Other vegetables which may have their iodine content increased in like manner include green beans and turnips.

By maintaining at all times an ample and sufficient supply in the nutrient liquid of those mineral ingredients (both essential and trace ingredients) required by the plant it is to be expected that the resulting vegetative growth or fruits therefrom will contain always the maximum quantity of mineral constituents. However, other effects may be secured also. Thus, by keeping available and readily assimilable source of nitrogen at hand, as for example in the form of potassium or calcium nitrate, vegetables of maximum vitamin content may be secured.

In regulating or controlling the growth of plants it is of course essential that not only all the necessary or required nutrients be present but that they also remain dissolved in the aqueous liquid. It is in the latter condition (i. e., in the dissolved state) that they readily are absorbed and utilized by the plant. If precipitation should occur not only may the concentration of salts be altered materially but the elements contained in the precipitated material may be partially or even incompletely available to the plant.

As a rule the proper choice of water-soluble salts containing the essential elements in their chemical composition will avoid or eliminate this undesirable condition. However, this difficulty is experienced often when salts containing the trace elements, e. g., manganese, iron, zinc and the like, are included in the nutrient medium. Since the trace elements are necessary for healthy plant growth and development it is desirable that they always be maintained in solution.

An example of a nutrient mixture containing essential elements and yielding no insoluble material on dissolving is one having the following composition:

| | Parts by weight |
|---|---|
| $NaH_2PO_4 \cdot H_2O$ | 60 |
| $KNO_3$ | 100 |
| $CaSO_4 \cdot 2H_2O$ | 60 |
| $MgSO_4$ (anhydrous) | 40 |
| $(NH_4)_2SO_4$ | 25 |

When this mixture is ground in the ball mill it gives rise to a white fluffy powder which dissolves completely in water without formation of insoluble material or precipitates.

Since most plants require nutrient solutions of pH 4.0 to 6.0, it is a part of this invention to add to such nutrient mixture, such as that just mentioned, a pH-controlling agent such as potassium acid-sulphate, sodium acid-sulphate, or monopotassium phosphate. These substances serve not only to regulate pH of nutrient solutions and prevent formation of insoluble bodies containing essential and/or trace elements, but act as plant foods as well. A typical nutrient composition as proposed by this invention is as follows:

| | Parts by weight |
|---|---|
| $NaH_2PO_4 \cdot H_2O$ | 60 |
| $KNO_3$ | 100 |
| $CaSO_4 \cdot 2H_2O$ | 60 |
| $MgSO_4$ | 40 |
| $(NH_4)_2SO_4$ | 25 |
| $KHSO_4$ | 25 |
| Ferrous sulphate | 4.0 |

With above ingredients was incorporated also 0.5 part by weight of a mixture consisting of boric acid, 1 part, manganese sulphate, 1 part, zinc sulphate, 1 part, copper sulphate, 0.25 part and potassium iodate, 2 parts.

The resulting composition when dissolved in water of pH 8.0 to 8.5, to the extent of 1.30 parts by weight of solids per 1000 parts by weight of water, gives a nutrient solution of pH 4.0 to 4.5 which is favorable to plant growth. At the same time no precipitation of plant nutrient or other bodies occurred.

Another part of the present invention comprises incorporating in nutrient compositions certain water-soluble gums which act as precipitate-forming inhibitors. Of this class of substances, gum arabic and agar-agar are examples. In nutrient solutions, iron and certain of the other trace elements, such as copper, and so forth, have a tendency to slowly change themselves into forms in which they are of little value to plants. Thus iron tends to settle out of solution in an insoluble form. An example of a mixture of the type from which iron tends to precipitate is as follows:

| | Parts by weight |
|---|---|
| $NaH_2PO_4 \cdot H_2O$ | 40 |
| $KNO_3$ | 100 |
| $CaSO_4 \cdot 2H_2O$ | 60 |
| $MgSO_4$ (anhydrous) | 40 |
| $(NH_4)_2SO_4$ | 25 |
| $Fe(NO_3)_3 \cdot 9H_2O$ | 5 |

When 1.3 parts by weight of this mixture were dissolved in 1000 parts by weight of water, the iron precipitated and settled within 1 day.

On incorporating 20 parts of gum arabic with the above dry nutrient salt mixture a composition was secured which, when dissolved to the extent of 1.3 parts by weight in 1000 parts by weight of water, remained in solution for several days without yielding insoluble bodies.

It is to be understood that this invention allows for the combined use of the improvements proposed in the three immediately preceding examples, namely (1) non-precipitating fertilizing salts; (2) use of pH-controlling agents; and, (3) use of precipitate-forming inhibitors. An example of the combined application of these improvements is embodied in a nutrient mixture having the following composition:

| | Parts by weight |
|---|---|
| $NaH_2PO_4 \cdot H_2O$ | 60 |
| $KNO_3$ | 100 |
| $CaSO_4 \cdot 2H_2O$ | 60 |
| $MgSO_4$ (anhydrous) | 40 |
| $(NH_4)_2SO_4$ | 25 |
| $NaHSO_4$ | 10 |
| $FeSO_4 \cdot 7H_2O$ | 4 |
| Gum arabic | 25 | and containing also 0.5 part by weight of a mixture consisting of boric acid, 1 part, manganese sulphate, 1 part, zinc sulphate, 1 part, copper sulphate, 0.25 part, nickel sulphate, 1 part, and potassium iodate, 2 parts.

When 1.3 parts by weight of the above composition (ground to powder in a ball mill) were stirred into 1000 parts by weight of water of pH 8.2, the former dissolved completely without formation of precipitates to give a nutrient solution of pH 5.4. After standing in an open transparent glass vessel for several days, the solution was still perfectly clear and showed no tendency toward formation of insoluble bodies.

The nutrient solution just described was employed for the growing of tomatoes by hydroculture method.

My invention involves the propagation of plants and vegetables by hydroculture methods and simultaneously regulating the rate of growth and/or the development of flowers or fruits thereof. It also involves the preparation of plant nutrient compositions which, when dissolved in water and the solution employed as a nutrient medium, will not yield a substantial proportion of precipitant or insoluble material. Such compositions remaining substantially completely dissolved in the aqueous liquid will furnish therefore a homogeneous nutrient medium of readily available and assimilable plant food ingredients.

According to my invention, substantial non-formation of insoluble material is accomplished by incorporating into a plant nutrient composition either a precipitant-forming inhibitor or a pH-controlling salt, or both. It is essential, of course, that both agents be water-soluble and exert no deleterious effects on the plants at hand.

Another feature of my invention involves increasing the mineral constituents of vegetables. This may be attained (1) by keeping in solution all the components of the nutrient composition, thereby making them available and absorbable by the plant and (2) by increasing the proportion of one or more components of the plant nutrient thereby rendering available in greater quantity those constituents which it is desired to secure in greater proportions in the plant product.

What I claim is:

1. In the hydroculture of plants, a nutrient composition comprising a mixture of water-soluble plant-nutrient salts and a water-soluble gum precipitant-forming inhibitor essentially free of albuminous bodies, the proportion of said inhibitor being 7 to 8 per cent of said composition and being sufficient to prevent substantial formation of insoluble material when said composition is dissolved in water.

2. In the hydroculture of plants, a nutrient composition comprising a mixture of water-soluble plant-nutrient salts, a water-soluble gum precipitant-forming inhibitor essentially free of albuminous bodies, and a water-soluble pH-controlling acidic salt of an alkali metal, the proportion of said inhibitor being 7 to 8 per cent of said composition and being sufficient to prevent substantial formation of insoluble material and the proportion of pH-controlling salt being sufficient to maintain the pH at not less than 3.5 and not more than 6.0 when said nutrient composition is dissolved in water.

3. In the hydroculture of plants, a nutrient composition according to claim 1 in which the precipitant-forming inhibitor is gum arabic.

CARLETON ELLIS.